United States Patent
Sonntag et al.

(10) Patent No.: US 11,475,054 B2
(45) Date of Patent: Oct. 18, 2022

(54) LANGUAGE DETECTION OF USER INPUT TEXT FOR ONLINE GAMING

(71) Applicant: Roblox Corporation, San Mateo, CA (US)

(72) Inventors: Nikolaus Sonntag, San Mateo, CA (US); Aswath Manoharan, San Mateo, CA (US); I-Wu Lu, San Mateo, CA (US); Eric Holmdahl, San Mateo, CA (US); Madhok Shivaratre, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 181 days.

(21) Appl. No.: 16/858,467

(22) Filed: Apr. 24, 2020

(65) Prior Publication Data

US 2021/0334299 A1    Oct. 28, 2021

(51) Int. Cl.
    *G06F 16/00*    (2019.01)
    *G06F 16/33*    (2019.01)
    *G06N 20/00*    (2019.01)
    *G06F 16/335*   (2019.01)
    *G06F 40/56*    (2020.01)
    *G06F 16/332*   (2019.01)
    *G06F 40/263*   (2020.01)

(52) U.S. Cl.
    CPC ........ *G06F 16/3334* (2019.01); *G06F 16/335* (2019.01); *G06F 16/3329* (2019.01); *G06F 40/263* (2020.01); *G06F 40/56* (2020.01); *G06N 20/00* (2019.01)

(58) Field of Classification Search
    CPC ............. G06F 16/3334; G06F 16/3329; G06F 16/335; G06F 40/56; G06F 40/263; G06N 20/00
    USPC ......................................................... 707/748
    See application file for complete search history.

(56) References Cited

U.S. PATENT DOCUMENTS

| 8,145,636 | B1 * | 3/2012 | Jeh ........................ G06F 16/353 |
| | | | 707/750 |
| 10,083,176 | B1 | 9/2018 | Desai et al. |
| 10,388,272 | B1 | 8/2019 | Adams et al. |

(Continued)

OTHER PUBLICATIONS

"International Search Report and Written Opinion in International Application No. PCT/US2021/027285", dated Jul. 29, 2021, 11 Pages.

*Primary Examiner* — Monica M Pyo
(74) *Attorney, Agent, or Firm* — IP Spring; Lisa Benado

(57) ABSTRACT

A user query, such as a user query processed by the online game system, is provided as input into a trained machine learning model. The machine learning model predicts candidate languages of the user query and outputs language confidence scores for the candidate languages. The user query is also matched with stored query data associated with game information in individual language databases for the respective candidate languages. A match scores may be determined based on a certainty of the respective response matches. The match scores and the language confidence scores may be weighted to determine a weighted score. The weighted scores of the response matches are applied to decide which game information retrieved from the identified database is used in forming a response of search results to the user.

19 Claims, 6 Drawing Sheets

(56) References Cited

U.S. PATENT DOCUMENTS

| | | | |
|---|---|---|---|
| 2015/0046152 A1* | 2/2015 | Lee | G06F 16/35 |
| | | | 704/9 |
| 2015/0106157 A1* | 4/2015 | Chang | G06F 40/237 |
| | | | 705/7.29 |
| 2015/0356170 A1* | 12/2015 | Allen | G06F 16/338 |
| | | | 707/725 |
| 2018/0189259 A1 | 7/2018 | Funiak et al. | |
| 2019/0197106 A1 | 6/2019 | Doggett | |
| 2019/0349320 A1 | 11/2019 | Bojja et al. | |

* cited by examiner

LANGUAGE DETECTION OF USER INPUT TEXT FOR ONLINE GAMING

BACKGROUND

Online gaming provides an opportunity for player located around the world to participate together, regardless of geographical and language boundaries. Gaming platforms often enable a user to input text, such as a search query, that assists the user in interacting with games. The text inputted into online games typically has distinctive characteristics. Recognizing possible languages of the text may assist in effectively responding to the text.

Machine learning may be leveraged for natural language processing (NLP) to interpret text inputted by a user of an online gaming platform. Algorithms, e.g. predictive models, can be created to learn from empirical data via training and to perform analysis of the user input text. Such artificial intelligence requires clean and relevant data for proper training of the machine learning model in the online gaming context.

SUMMARY

Implementations of this application relate to detecting a language of a user query inputted by a user of online games, by use of a trained machine learning model. The machine learning model is trained with processed text data relevant to online gaming.

In some implementations, a method includes receiving a user query and separating the user query into a plurality of n-grams. At least one candidate language is identified by applying a machine learning model to the plurality of n-grams of the user query. The machine learning model is trained with at least one multilingual text corpus and game-related data. A respective language confidence score for each of the at least one candidate language is determined by applying the machine learning model. The at least one candidate language is used to select at least one language-specific databases to search. A response match is identified in the at least one language-specific databases and a respective match score is determined for each of the response matches. A weighted score is determined by at least the respective language confidence score and the respective match score. The weighted score is used as a basis to determine at least one query language for the user quay.

Various implementations and examples of the method are described. For example, in some implementations, the method also includes determining game information associated with the response match in the at least one language-specific game database. A search result to the user query is generated based on the game information. The game information may include webpage information for online games. The search result may include one or more user interface elements that, when activated by a user, links a webpage associated with a respective one of the online games.

In some implementations, user profile information associated with the user query is provided and the at least one query language is further based on user profile information. The respective confidence score may be further determined by identifying one or more segments of the plurality of n-grams that are relevant to the at least one candidate language. The at least one candidate language may also include an unidentified language and the language-specific game database may include a database associated with unknown languages.

In some implementations, a system is provided that includes a computing device with one or more processors for detecting language of a user query for online games. The computing device also includes logic encoded in one or more tangible media for execution by the one or more processors and when executed operable to perform operations. The operations include receiving a user query and separating the user query into a plurality of n-grams. At least one candidate language is identified by applying a machine learning model to the plurality of n-grams of the user query. The machine learning model is trained with at least one multilingual tact corpus and game-related data. A respective confidence score for each of the at least one candidate language is determined by applying the machine learning model. The at least one candidate language is used by the operations to select at least one language-specific databases to search. A response match is identified in the at least one language-specific databases and a respective match score is determined for each of the response match. A weighted score is determined by at least the respective language confidence score and the respective match score. The weighted score is used as a basis by the operations to determine at least one query language for the user query.

Various implementations and examples of the operations performed by the operations are described. For example, in some implementations, the operations also includes determining game information associated with the response match in the at least one language-specific game database. The search result to the user query is generated based on the game information. The game information may include webpage information for online games. The search result may include one or more user interface elements that, when activated by a user, links a webpage associated with a respective one of the online games.

In some implementations, user profile information associated with the user query is provided and the at least one query language is determined by the operations further based on user profile information. The respective confidence score may be further determined by the operations identifying one or more segments of the plurality of n-grams that are relevant to the at least one candidate language. The at least one candidate language may also include an unidentified language and the language-specific game database may include a database associated with unknown languages.

Various implementations and examples of a method of training a machine learning model to identify a language of a user query for online games are described. Text data is received that include at least first text data, associated language labels for the first text data and second text data unlabeled for languages. Associated language labels are determined for the second text data based on a threshold number of a plurality of non-specific language detectors identifying at least one language. Training text data are created by separating the text data into n-grams. The machine learning model is trained to generate at least one candidate language identifier of the user query and a respective language confidence score. Training text data is fed to the machine learning model for training without the associated language labels. The machine learning model outputs predicted language labels. Retraining of the machine learning model may be conducted with discrepancy information between the current predicted language labels and the associated language labels, to update the current predicted language labels. The retraining may be iteratively repeated until the discrepancy information meets a threshold of accuracy.

In some implementations creating the training text data further includes splitting word strings of the text data having a length greater than an upper threshold length, into random word lengths of a predetermined length. In some implementations creating the training text data further includes aggregating work strings of text data having a length shorter than a low threshold length, with related text to create extended strings of words. The training data set may also be created by determining the n-grams that meet a commonality threshold across languages and within languages. In some implementations, the n-grams may include at least one of: one character, two characters, or three characters.

In some implementations the text data may include at least one collection of game-related data that includes at least one of game titles, chat texts, game source data, or slang terms. In some implementations, a vector that includes respective confidence scores for multiple languages is generated and multiple-language specific databases of the at least one language-specific game database corresponding to the respective confidence scores are searched based on the user query.

BRIEF DESCRIPTION OF THE DRAWINGS

The disclosure is illustrated by way of example, and not by way of limitation in the figures in which like reference numerals are used to refer to similar elements.

DETAILED DESCRIPTION

Figure 1:
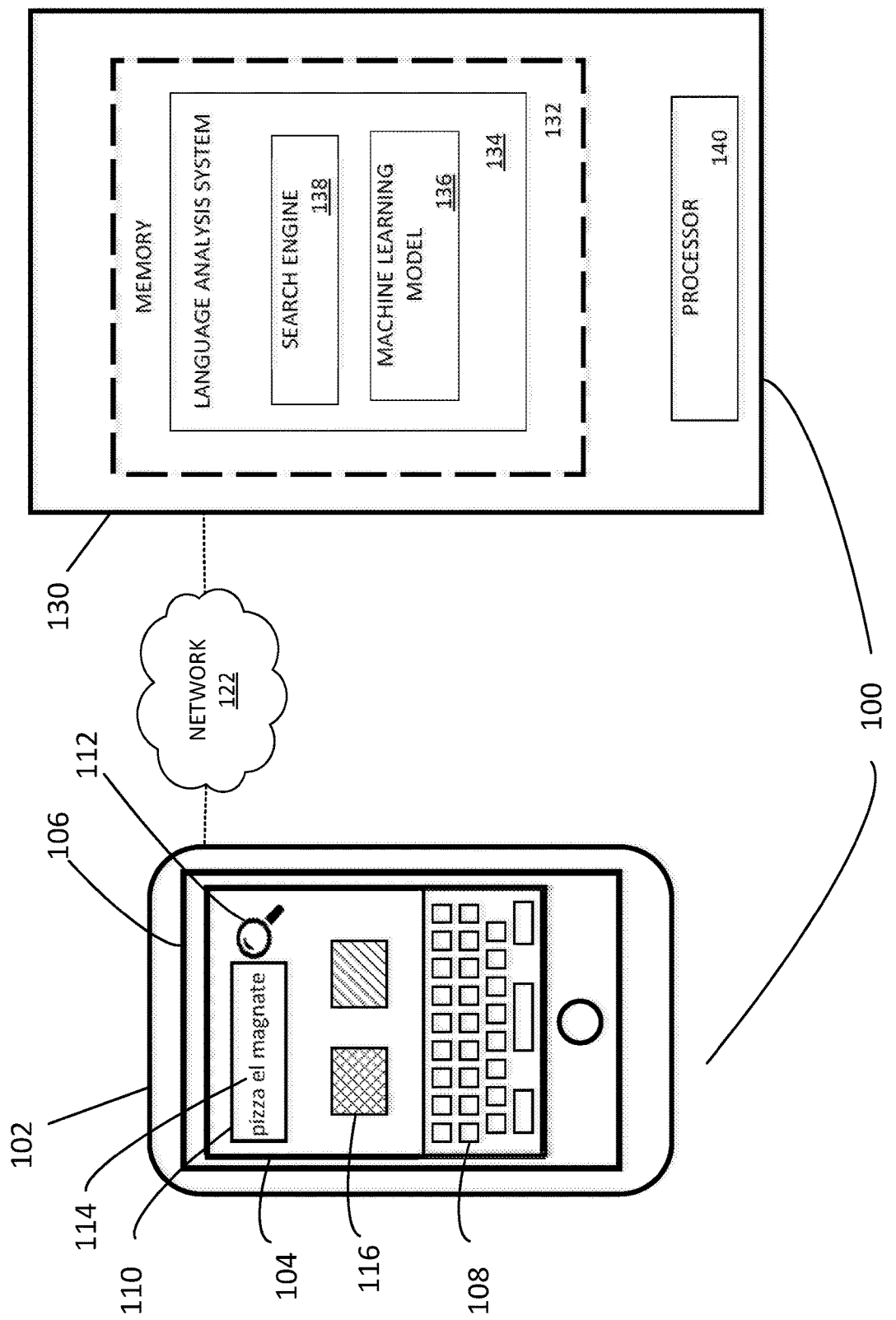
FIG. 1 is a conceptual diagram illustrating an example environment in which various aspects of evaluating a user query may be implemented in an online game system, in accordance with some implementations.

Online game systems enable users (e.g. players of games, game developers, etc.) to access games via online gaming platforms, e.g. client computing devices. In some implementations, users may communicate with an online game system or with other users of the online game system by transmitting text messages, e.g., queries, commands, chats, etc., within the online gaming system. For example, user queries may be entered by users to request information and to locate games, such as by game title, keywords, game description, genre, players, developers, game quality, etc. User queries may also be inputted to find particular aspects of a game, such as locating certain players or player groups, virtual items for use in games, e.g. avatar parts, clothing, and accessories, and game developer tools, e.g. packages, decals, audio, and plugins.

In various implementations, the present online game system evaluates a user query and formulates a response that includes a search result to the query. The online game system employs a language analysis system to detect potential languages of a user query and to assist in efficient and reliable searching for results to formulate the response.

Often, user queries entered by users into online gaming platforms are text strings that are shorter in length than an ideal length for typical easy language analysis. For example, the user query may be a string of ten-words, a string of a few words or a couple of words, or a single word. A user query may be in the form of one or mom keywords, a phrase, a short sentence, a game title, and the like. A user query in online games may also include unique jargons with distinctive patterns and rules. The user query may be in one or more various languages, e.g. a language specific to a country or geographic region, a language known by a group of users, or a code. Due to the distinctive text used in online gaming platforms, standard language analysis techniques, such as by NLP, may result in erroneous language predictions when applied to user queries inputted into online gaming platforms. The present language analysis system allows for determinations of potential user query languages, such as by applying a machine learning model that is particularly trained, processing user queries, and determining and weighing cores, all according to the description presented. The online game system enables efficient and resource saving searches of game information in response to the user query, for example, by providing game-related databases dedicated to specific languages and limiting searches for game information to particular language databases that have the most potential to match the user query language. Identifying specific language databases in which to search reduces the need to comb through databases of all languages including unrelated databases to find response matches, thus reducing processing time and computing resources.

Narrowing the search to the language-specific databases of candidate languages may enable use of more meaningful search terms to provide better results. Various languages may apply different rules to interpret search terms, For example, not all languages use spaces between words the same. Also, common words, such as the articles "the" or "a", may not be considered for searching in a particular language, but may be significant in another language.

Techniques to score and assign weight values employed by the language analysis system, as well as retraining of the machine language model enables greater accuracy and reliability of search results. Furthermore, without the present machine language model trained for text particular to online gaming, there may insufficient information in a terse user query from which standard NLP can deduce a query language.

The user query, such as a user query processed by the online game system, is provided as input into the specifically trained machine learning model. The machine learning model predicts candidate languages of the user query and outputs language confidence scores for the candidate languages. For example, candidate languages associated with confidence scores that meet a confidence threshold may be used to determine which language-specific databases to search. The user query is matched with stored query data associated with game information in individual storage buckets (e.g., databases) for at least some of the respective candidate languages. A match score for each response matches may be determined based on a certainty of the respective response matches. The match scores and the language confidence scores may be weighted to determine a weighted score. The weighted score may be used to determine which search results from the response matches to provide in a response to the user. For example, the search results may be ranked based on the weighted score and a top threshold number of search results may be used in a response to the user query.

The machine learning model of the language analysis system is trained with relevant text data, pre-processed for an online gaming context. Texts related to online gaming platforms are generally unique. Machine learning models benefit from being trained on actual online gaming data to perform with precision in evaluating user queries. Predicted language labels are generated by the machine learning model during training. The language labels may be used as feedback input to update the machine learning model and achieve a target level of accuracy.

In illustration of a usage example of the online game system employing the language analysis system according to one implementation, a player of online gaming system attempts to locate an online game in which she can run her own virtual pizza business. To further illustrate the usage example, FIG. 1 shows an instance of such an online game system 100 that includes a client computing device 102 communicating with a game server 130.

In the usage example, the player knows that the game relates to the word "tycoon." The player conducts a search for the game on the client computing device 102 by a user interface 104 on a display screen 106 of the client computing device 102. The user types a user query 114 into a text box 110 using keyboard 106. The user query 114 in this example contains keywords, "pizza" and "el magnate," the Spanish word for "tycoon" in English. She activates a display element 112 on the user interface 104 to initiate a search for games related to the entered keywords.

The user query 114 is transmitted across network 122 to game server 130. The game server 130 includes processor 140 that accesses the language analysis system 134 stored in a memory 132 and may perform one or more of the described steps to form a search result response to the user query 114.

The user query 114 may be processed and inputted into a machine learning model 136 of the language analysis system 134 to determine at least one candidate language of the user query and a confidence score for each candidate language. The machine learning model 136 has been trained with text data that has been pre-processed to adapt the text data to distinctive formats of user queries typical of online gaming. The pre-processing enables the machine learning model 136 to recognize languages from a small number of input words in the user quay. The machine learning model 136 may be updated with text data to reach a target level of accuracy.

In the usage example, the search engine 138 determines that a candidate language for the word "el magnate" may be Spanish. Candidate languages for the word "pizza" may be Spanish and may also be English, and/or Italian. The language analysis system determines that all three candidate languages have confidence scores that meet a predefined threshold. The language analysis system 134 searches in individual databases associated with each of Spanish, English and Italian languages to find matching game related information related to the term "tycoon" and "pizza." A match score is determined for each response match in the respective language-specific databases. The response score is based on the certainty of the database match. Search results to be included in a response is determined, based, at least in part, on weighted scores of the combined confidence score and response scores for the individual response matches. In addition, the player has a user profile associated with the online gaming platform that lists Spanish as a preferred language for her. Such user information may also be factored to boost the ranking of search results from the Spanish database in the response provided to the player.

The gaming platform device retrieves several games from the Spanish database that include the word, "tycoon" or "magnate" and the word "pizza" in the game title, or that otherwise relate to pizza business ownership. The search results of the matched games are transmitted through network 122 client computing device 102 and appear as selectable icons 116 on the display screen 106 of the client computing device 102. The search results are displayed in an order consistent with the weighted scores and relationship to the user quay. From the player's perspective, the results of her search quay are instantaneously received. On the user interface 104, the player clicks on one of the icons 116 for the game she chooses to play and a link connects her to a webpage to play the game.

Example Pre-Processing Training Data

Figure 2:
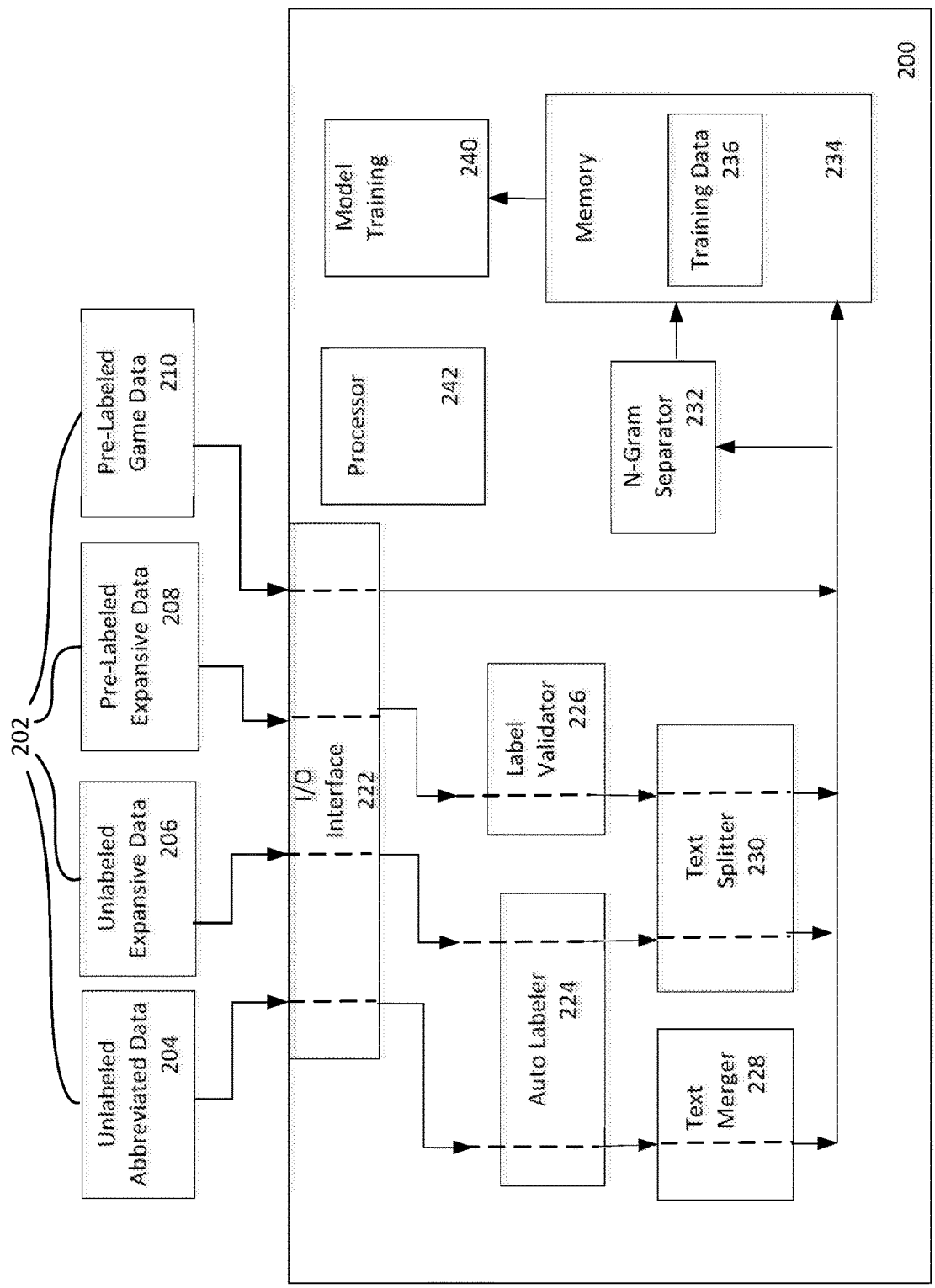
FIG. 2 is block diagram illustrating elements of an example data processing computing device to pre-process text data and to create training text data for a language analysis system, in accordance with some implementations.

FIG. 2 shows by way of a block diagram of a data processing device 200, such as the game server 130 shown in FIG. 1, for pre-processing tat data performed by one or more processors 242 of the data processing device 200. Text data is adapted for training the machine learning model in an online gaming context.

In some implementations, the data processing device 200 may be a separate computer from the game server 130. In this case, the processed training data may be used by the data processing device 200 for training the machine learning model 136 and then transmitted by the data processing device 200 to the game server 130 or to another intermediary computing device for training the machine learning model 136. The techniques employed by the data processing device 200 are used to generate training text data in preparation for training the machine learning model 136 to determine a language of a user query.

In some implementations, more than one machine learning model 136 may be trained with at least a portion of the training text data. In some implementations various types of text data are used for training multiple machine learning models. The machine learning models may be evaluated and a machine learning model may be chosen for a particular user query, such as evaluating for accuracy and relevance to a user query.

The text data may include various types of collections of text data 202 received from different sources by data processing device 200 at an input/output interface 222. The text collections 202 may be in different languages or may be a single collection that may include a mix of languages.

The text collections 202 may include text data having prior existing labels that specify the language of the text, such as pre-labeled expansive text data 208 and pre-labeled game-related text data 210. Pre-labeled expansive text data 208, for example, may include voluminous publicly available corpuses, such as multilingual text corpuses that may be translated into many languages and dialects, e.g. hundreds of languages. Multilingual text corpuses may include online encyclopedias, e.g. Wikipedia's in various languages (www.wikipedia.org), which data may also be accessed through a Wikipedia Application Programming Interface (API). Multilingual text corpuses may also include international historical documents, e.g. The Universal Declaration of Human Rights (https://www.ohchr.org/EN/UDHR/Pages/UDHRIndex.aspx). Some pre-labeled text data may have prior language labels validated by label validator 226.

The label validator 226 provides an indication of whether the pre-existing language labels of the pre-labeled text data are correct or incorrect. The label validator may assist in strengthening accuracy of labels, for example, in the case that there is not adequate confidence in a pre-existing language label for given text data. For example, a text collection may include a majority of text in one language, but also include words in other languages (e.g., names, etc.). The label validator 226 may employ multiple non-specific language detectors, e.g. publicly available libraries, to detect language with a minimum threshold consensus in the languages indicated by the non-specific language detectors. Non-specific language detectors may use language detection models and/or language libraries, including any combination of open source, paid services, previous versions of models generated by the online game system, and other language detection models and language libraries. In some implementations, a minimum confidence threshold may be adjusted to be lower for pre-labeled tat data that originate with more confident language labels. Input pre-labeled tat data strings with consensus between the pre-existing label and the language determined by a threshold number of the non-specific language detectors, may be added to the training dataset. If the non-specific language detectors fail to detect a same language to the confidence threshold level for a given pro-existing label, the pro-labeled tat data may be excluded from the training data.

Game-related text data 210 may include various text associated with online games, such as game titles, game instructions, text displayed to players as part of a game, game descriptions, common user search queries in online gaming platforms, common chat messages in online gaming platforms, typical slang terms related to online games, etc. In some implementations, game-related text data 210 is selected from online line games that meet a popularity threshold and/or ranking. Game-related data may be predominately in a particular language, e.g. English, and include manually added labels in the predominate language. Game developers may associate language labels to the text related to a game. However, manually labeled text data may lack reliability and the labels may be assessed by label validator 226. Machine translation may also be applied to such text data to translate game-related data and associate languages labels, especially for text data in obscure languages. This may provide additional training data in languages where an existing corpus of training data may be limited in number of available data samples.

Text collections 202 may also include text data without prior existing language labels, such as unlabeled abbreviated text data 210 and unlabeled expansive text data 206, for example, descriptions of online games.

Unlabeled text data may have language labels created and associated with the text data by auto labeler 224. The collections of text data may include game-related data, such as game titles, chat texts, game source data, slang terms, and other text common to online gaming. The auto labeler 224 may employ a plurality of non-specific language detectors using multiple language detection models and language libraries to detect a language of a given text data string to accumulate a large set of training data. These models and library corpuses may be any combination of open source, paid services, previous versions of models generated by the online game system, and other language detection models and language libraries. A language determination by any of the non-specific language detectors may need to meet a confidence threshold to be considered for auto labeling. For each unlabeled text data strings inputted into the auto labeler 224, a language label is associated with the text data if a threshold number of the non-specific language detectors identify a same language with a minimum confidence threshold. For example, if there is language prediction consensus from all the language detectors with a configurable high level (e.g. threshold) of confidence, the label and text may be included for training data. If the non-specific language detectors fail to detect a same language to the confidence threshold level for a given unlabeled text data string, the unlabeled text data may be excluded from the training data.

The text data may also include word strings of a length that is greater than an upper threshold length. For example, publicly available corpuses may include very long sentences and paragraphs. Expansive text collections may include, for example, pre-labeled expansive text data 208 and unlabeled expansive text data 206. By contrast, user queries for online gaming platforms may be short word strings. In order to make the expansive text collections relevant to such short user queries, the strings of expansive text collection may be randomized to a reduced length to be similar to the length of typical user query strings. The expansive text data may be split by text splitter 230 to random word length strings, such as strings with 1 to 5 words.

Abbreviated text data 204, such as unlabeled abbreviated text data 204 may have word strings that are shorter in length than a low threshold length, such as 1 to 5 words. Examples of abbreviated text data may include stored chat texts and prior search queries that were previously utilized in the game platform. Short text strings can be difficult to detect in order to auto label the text data or validate pre-labels. Abbreviated text data may be aggregated by text merger 228. The abbreviated text data strings may be aggregated according to a shared characteristic of the text strings, such as text data authored by a common user or other common factors, to create longer strings that allow for easier auto labeling.

Text data may be broken into n-gram characters by an n-gram separator 232 to create processed training data 236. The n-gram characters may include a specified number of characters, such as one character (unigrams), two characters (bigrams), three characters (trigrams), etc. For example, a text data word string "A tycoon" may be broken into "A", "A t", "A ty", "Ty", and "Tyc," etc. The n-gram characters are used as features for training the machine learning model.

The training data may be in the format of feature vectors containing values, e.g. numbers, that represent each feature In addition to n-gram features, other features may be extracted from the text data and included as training data, which may be in the format of feature vectors, such as counts or existence of characters in different Unicode blocks, Unicode scripts, specific combinations of these, etc. For example n-gram feature vectors may include values in the form of 1's and 0's indicating that a particular n-gram exists in the input text, counts of the number of times the n-gram appears in the input text, etc.

The processed training data 236 in the form of n-grams may be saved in memory 234 and fed into the training module 240 as features to train the machine learning model. For example, a 3-gram character sequence "ity" may be input to the machine learning model as a fragment pattern.

In some implementations, the n-gram characters used as features for in training the machine learning model may include ASCII characters, Korean characters, Japanese characters, Russian characters, Latin characters, Cyrillic characters, or blocks of Unicode.

The language labels associated with the processed text data, such as the language labels by auto labeler 224, by label validator 226, and trusted pre-labels, may be utilized as ground truth labels for purposes of training the machine learning model.

Example Training Machine Learning Model

Figure 3:
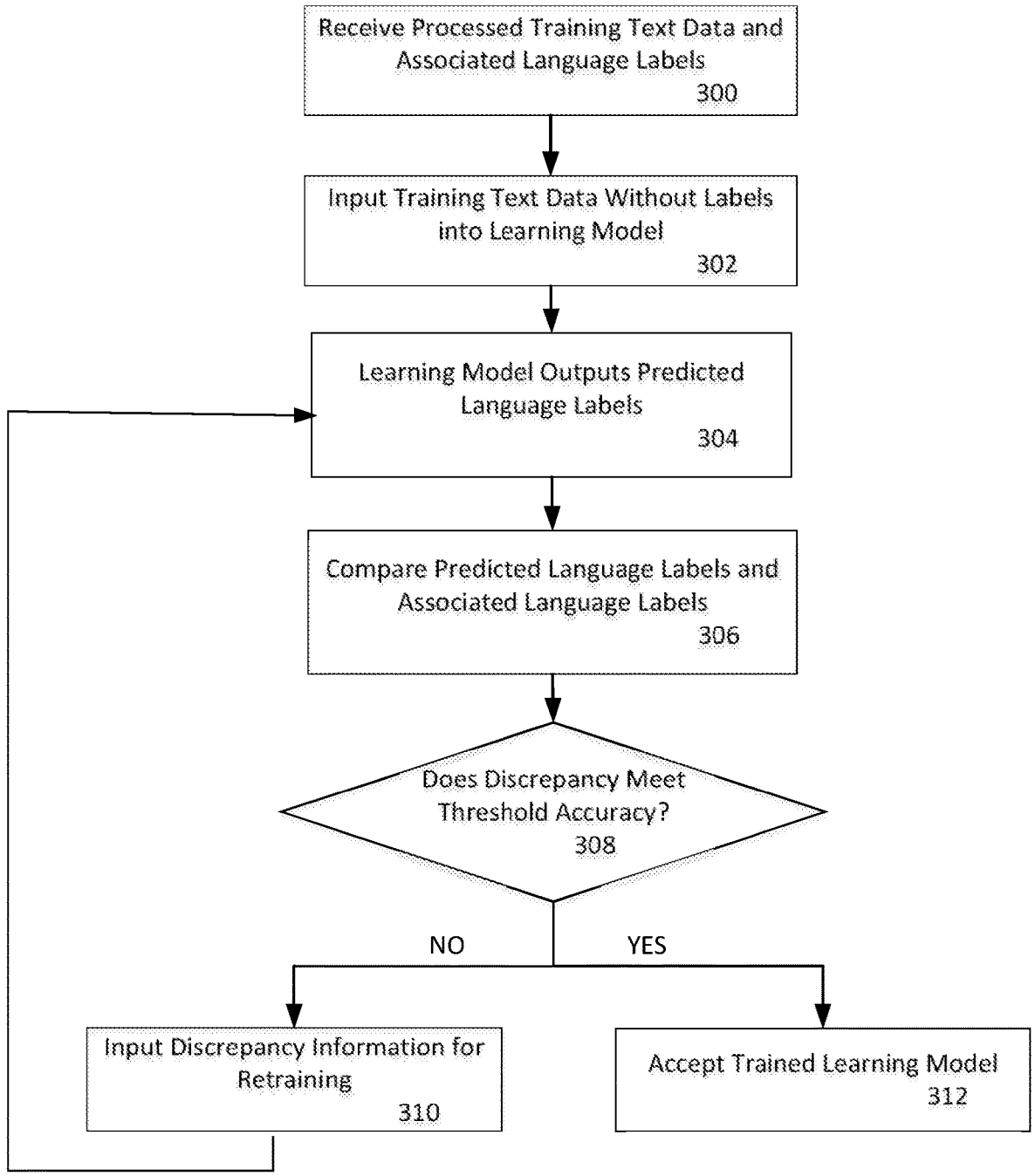
FIG. 3 is a flowchart illustrating an exemplary method to train a machine learning model for the language analysis system, in accordance with some implementations.

An example method to train a machine learning model for the language analysis system is shown in the flowchart in FIG. 3. In some implementations, the techniques to train the machine learning model may employ supervised classification algorithms, such as logistic regression algorithms using the n-gram features described with regard to FIG. 1, and counts of different character types in the n-grams. The most common n-grams across languages and within languages may be used as features. The processed training data and associated language labels, such as the ground truth language labels described with regard to FIG. 1, are received for training in block 300. In some implementations, the computing device that processes the training data and associated language labels may be separate from the computing device that is utilized for training of the machine learning model. In some implementations, the same computing device is used to perform the processing of training data and associated language labels as well as training of the machine learning model.

In block 302, the processed training data may be fed into an untrained machine learning model without the associated language labels for supervised training. In some implementations, the processed training data may be fed into an untrained machine learning model with the associated language labels for unsupervised training. In some implementations, the training data is in the form of feature vectors. Processed training data may be selected for training if the training data meets certain pre-defined factors. For example, the most common n-grams across languages and/or within particular languages may be used as features for training.

In block 304, the machine learning model analyzes the training text data and generates predicted language as output data, as described herein.

In block 306, the current predicted language labels are compared with language labels that are associated with the training data prior to the training, such as the language labels from the pre-processing of the training data. Discrepancy information is generated that is indicative of the difference between the predicted labels and the previously associated labels. In decision block 308, it may be determined if the discrepancy information meets a pre-defined threshold for the accuracy of the predicted language labels. If the threshold accuracy is not met, in block 310, the discrepancy information is fed back to the machine learning model to retrain the machine learning model and update the current predicted language labels. The process returns to block 304 for the machine learning model to re-determine and output predicted labels. The retraining may be iteratively repeated using additional training datasets until the discrepancy meets a threshold of accuracy. If threshold accuracy is met, in block 312 the process accepts the machine learning model as ready to evaluate a user quay.

In some implementations, mom than one machine learning model may be trained with different training dat. A machine learning repository may be provided to store and retrieve the trained machine learning models, including associated data and/or metadata. One or more of the trained machine learning models may be selected to evaluate an incoming user query. The machine learning repositories enable flexibility in using any version of the model at any time, or use different models on different parts of the tat being evaluated.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Example User Query Response

Figure 4:
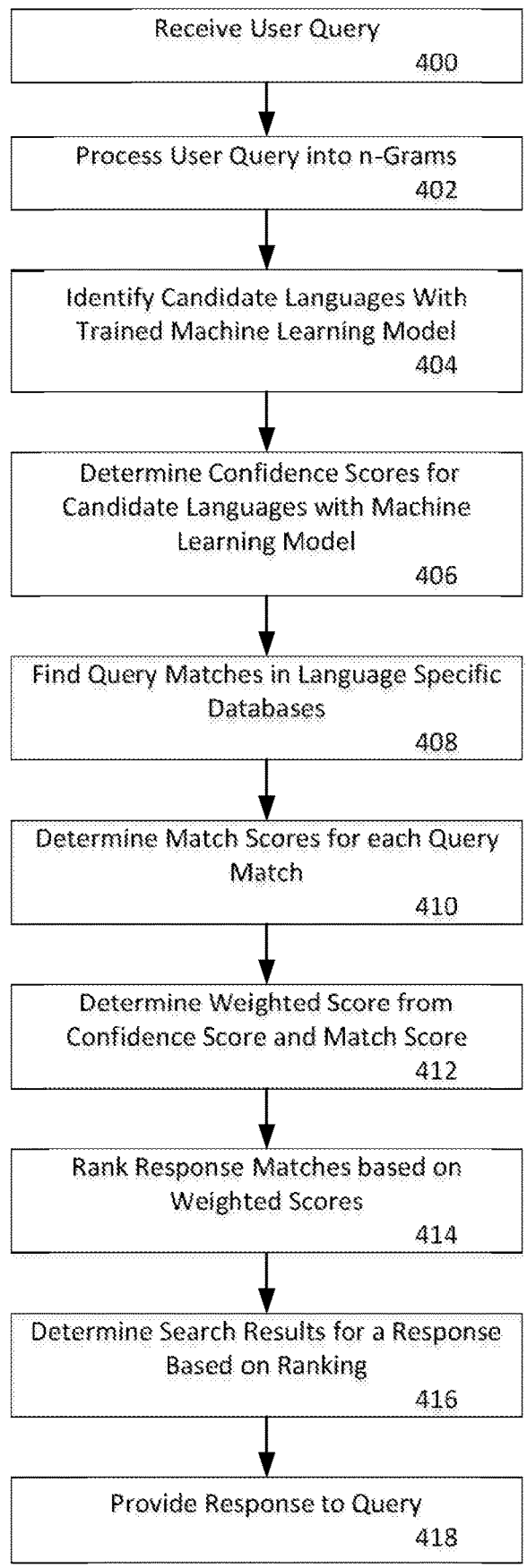
FIG. 4 is a flowchart illustrating an exemplary method to evaluate a user query by applying the machine learning model, in accordance with some implementations.

An example method to evaluate a user query by applying the machine learning model is shown in the flowchart in FIG. 4. The techniques include determining a language of the user query and responding to the user query.

In block 400, the user quay is received by the system. The user query may be entered by a user through various input ways, such as entering text through a keyboard. In some implementations, the user query may be initiated as voice input, such as through a microphone, by the user. The user query entered as audio may be converted to text. The input may include a user applying touch, voice, click, tap, type, gesture, movement (e.g. moving an eye, arm, body), and/or other actions.

In block 402 the user query may be processed for evaluation. For example, the user quay may be separated into n-grams, which may be performed in a manner similar to the processing of the training data by n-gram separator described with regard to FIG. 2.

In block 404, the trained machine learning model is utilized to identify candidate languages for the user quay. It may be determine using the machine learning model that certain n-gram segments of the processed user query are common and/or have meaning in particular languages, which are identified as candidate languages. For example, a 3-gram segment, "ity" of a user query may be found to be common in both English and French languages.

In some implementations, a candidate language may include an unknown language category in instances where a language of a user query is unidentified by the trained machine learning model.

In block 406 the machine learning model is applied to determine confidence scores for each of the candidate languages. In some implementations, the confidence scores indicate a degree of relevance of segments of the n-grams to the candidate language. A minimum threshold score for each candidate language may be returned by the machine learning model. Any language that returns a score over a minimum threshold is returned as a possible candidate language.

In block 408 language databases that are specific to the individually named candidate languages are searched to find matches with the words of the user query in its unprocessed form. The language-specific databases include game information associated with the response matches. Language-specific databases of candidate languages that meet pre-defined searching criteria may be searched. In some implementations, candidate languages may be ranked according to the respective candidate scores. Language-specific databases for the top designated number of ranked languages may be searched. In some implementations, language-specific databases of candidate languages that meet a threshold confidence score are used in the search.

In some implementations, a vector that includes scores for multiple languages is generated, and multiple language specific databases corresponding to the scores are searched based on the user query. A consolidated score that is based on the confidence score for the language and the score for the user query in each of the languages is generated. For example, for a given search query, the machine learning model may output a score for each language. Languages that are associated with confidence scores over a threshold may be used for searching. The confidence score for each language may also be used as a factor in the overall scoring and/or sorting of responses (e.g. online games) returned from the search query from each language database.

In some implementations, additional consideration factors may be used to boost or demote a confidence score, including user-specific information related to one or more languages. User-specific information may include user profile information, for example, language preferences specified by the user and may include user activity statistics, for example, data representing prior languages used by the user and/or languages of prior games played by the user. Such additional factors may be considered in determining a language-specific database to search. For example, a particular language indicated by the additional consideration factors, e.g., the user-specific information, may have a boost value that adds to a confidence score, or a demote value that subtracts from a confidence score. A resulting boosted score of a particular language may reach a confidence threshold or ranking, even if the confidence score without the boost value fails to meet a threshold or ranking criteria. A demoted score may remove a particular language even if the confidence score without the demote value meets a threshold or ranking criteria. A language-specific database of a language with a boosted score that meets the searching criteria may be searched.

In some implementations, additional consideration factors, e.g., user-specific information, are considered as separate criteria from a confidence score. For example, a language listed in a user profile may be a candidate language in addition to the candidate languages found by the machine learning model. Language-specific databases for languages indicated by the additional consideration factors, e.g., user-specific information, may be also searched.

In a circumstance in which a candidate language is an unidentified language by the machine learning model, a language-specific database associated with unknown languages may be searched for response matches. In some implementations, an unknown language database is searched by default along with language-specific databases related to determined quay languages.

In some implementations, prior to searching n the identified language-specific databases the user query may be processed to adapt to search requirements and practices of a particular candidate language-specific database. For example, where a language does not recognize or consider a certain word, (such as the words "the" and "a") for searches, the word may be dropped as a search term in that language-specific database. In another example, the use of spaces between words or sentences may be modified to meet the conventions of a language.

Some words may be valid words in multiple languages. For example, a user query that includes keywords, "pizza place" may result in English and Italian language results. In another example, a user query that includes the term "lava" may result in a finding of at least English, Croatian, Czech, Danish, Dutch, German, Norwegian, and Spanish languages.

In block 410 match scores are determined for each response match in the language specific databases. The match scores indicate a measure of closeness of the matches of the user quay to stored user queries in particular languages in the language-specific databases. For example, a match score may be based on the number or percentage of words in a quay that have an act match in a language-specific database. In some implementations, the match score may represent the character match of the words in a user query with words in a language-specific database. In some implementations, other standard relevance scoring techniques may be employed, such as Terms Frequency-Inverse Document Frequency methods (TF-IDF) and Bag of Words retrieval functions (Best Matching—BM25).

In block 412 a weighted score is determined from the confidence score and the match score of a language. Each result may have two scores associated with it, a confidence score from the machine learning model and a match score from language databases, which may be a combination of multiple scores from matching in various language databases. One of the match score or confidence score, may be used to boost or demote the other score by associating weights to the two scores, resulting in the weighted score.

In some implementations, the scores may be normalized between databases to more accurately compare matches. For example, match scores in a particular language database may be high because there are fewer search hits or less entries in the database as compared to another language database that includes more search hits. Normalizing the data within the databases may provide more accurate match scores.

In block 414 the response matches are ranked according to the weighted score. Additional consideration factors may be applied to boost or demote a ranking. In block 416, search results to be provided in a response are determined based, at least in part, on the ranking of the response matches, as illustrated below.

In some implementations, user-specific information may be considered to boost the determination in favor of a particular query language or demote the determination against a particular query language. Some examples of user-specific information include user profile information, amount of player engagement with games of a particular language, and amount that a player interacts with online games using a particular language, e.g. prior user queries, chats, text, etc.

To illustrate, a confidence score for a particular search query, for example, may be 90% for French and 60% for Spanish based on the machine learning model output. A top three matches in a French database have match scores of 500 (F1), 450 (F2), and 200 (F3) respectively, and a top three matches in a Spanish database have match scores of 750 (S1), 400 (S2) and 250 (S3), respectively. In this example, weighted scores for the French matches may be 450 (F1), 405 (F2), and ISO (F3), respectively. The weighted scores for the Spanish matches may be 450 (S1), 240 (S2), and 72 (S3). The ranking order according to the weighted scores may be F1 and S1, F2, S2, F3, and S3. In this example, a ranking threshold may be provided to provide as a search result, the top pre-defined number of matches, such as the matches having the top four weighted scores, or to provide matches with a weighted score over a predefined value, such as 200. In either case, the response to the user may be provided in the order of the ranking: F1 and S1, F2, and S2. In addition, other consideration factors may be applied to boost or demote the weighted scores, especially to break the tied weighted scores of F1 and S1. For example, if a user profile or previous user experience is in French, then F1 may be ranked prior to S1 in the response. In some implementations, only highest ranking search results that are consistent with consideration factors, e.g. user profile, may be provided in the response.

In block 418 a response that includes search results to the user query is surfaced for the user. The response may be based on game information identified by the response matches in the language-specific databases for the potential query languages. For example, the identified game information may be included in the search result response or otherwise referenced to create the response.

To provide a search result response, the game information may be aggregated and ranked. In some instances, the same search results, e.g. online games, may appear in multiple language databases. If duplicate search results are obtained, the system may dedupe the results using logic. For example, identical or substantially similar results may be filtered out to remove the duplicates. In some implementations, when a same search result is found in multiple language databases the system may choose the duplicate search result, e.g. game, from the language-specific database having a highest weighted score to be presented to the client device in the search result response.

Some game information listed in a language-specific database may not be reliably categorized as a particular language. The game information may be manually categorized as a language, for example, by a game developer and may be inaccurate. A listing of game information for a particular language may be validated by reference to supplemental language information, such as game statistics and user profile languages for users who access a game associated with the game information. In some implementations, a game database may be seeded for a language based on supplemental language information, such as an amount of player traffic in a particular language in a game, such as indicated by user profile language information of players of the game.

In some implementations, game information may include connect information such as webpage information, e.g., a Uniform Resource Locator (URL) for an online game or information for launching a game application. For example, a search result response may include one or more user interface elements, such as icons. The interface element, e.g. a link, may be activated by a user action, such as clicking, tapping, keyboard action, voice command, etc. to navigate to digital information, e.g. a webpage, an application, etc., associated with playing a respective one of the online games. In this manner, a user may connect to an online game and play the game or receive descriptive information about the game, such as certain players or player groups, virtual items for use in the game, e.g. avatar parts, clothing, and accessories, and game developer tools, e.g. packages, decals, audio, and plugins. For example, the digital information may be a start webpage to begin playing a particular game.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Example Game Server

Figure 5:
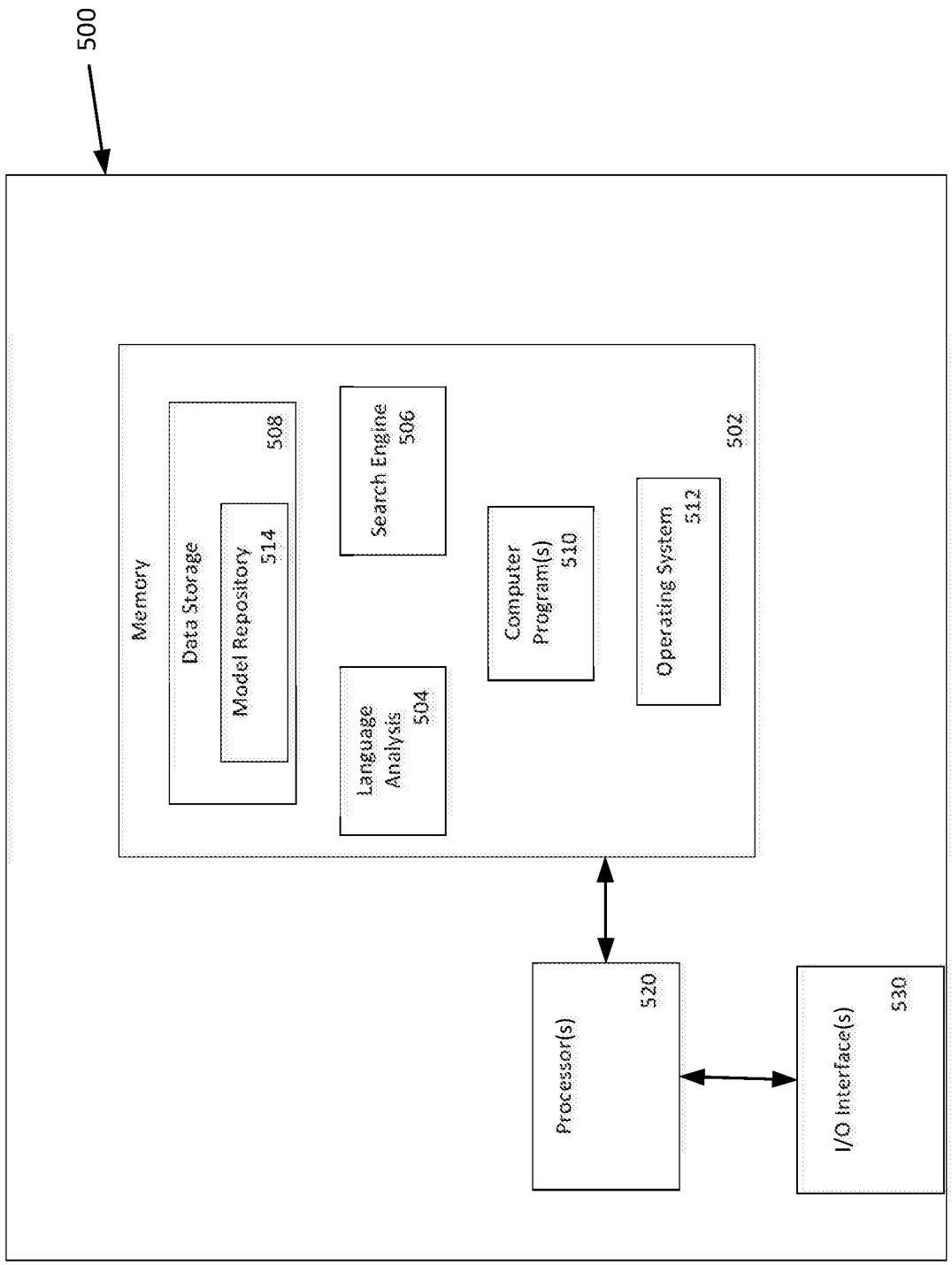
FIG. 5 is a block diagram illustrating an exemplary computing device for analyzing a user query and providing a search result response, in accordance with some implementations.

FIG. 5 is a block diagram that shows example elements of a game server 500 of the online game system, such as the game server 130 shown in FIG. 1. The game server 500 may analyze a user query and provide a search result response, for example using the method described with regard to FIG. 4. Specifically, game server 500 may be a sub-system of an overall system architecture (shown and described in more detail with respect to FIG. 6).

The various elements of the game server 500 are shown in FIG. 5 as discrete/separate elements for purposes of illustration and explanation. According to some embodiments, it is possible to combine some of these elements into a single element or device, while in other implementations of the online game system, these elements may be distributed across a network such as in a cloud computing network. For example, in a multiple server implementation, elements associated with the language analysis system 504 may be located and operated at one server, while elements associated with query evaluator 506 may be located at another server remote from the first server.

The game server 500 may include memory 502, processor 520, and I/O interface 530. Memory 502 may include language analysis system 504 (such as language analysis system 134 described with reference to FIG. 1), search engine 506 (such as search engine 138 described with reference to FIG. 1), data storage 508, computer program(s) 510, and/or operating system 512.

I/O interface 530 can provide functions to enable interfacing the game server 500 with other systems and devices, such as servers over a wireless network, such as network 122 described with regard to FIG. 1. Interfaced devices can be included as part of the game server 500 or can be separate and communicate with the game server 500. In some implementations, network communication devices, storage devices (e.g., memory and/or databases), and input/output devices can communicate via I/O interface 530.

The I/O interface 530 can interface to other input and output devices. In some implementations, the I/O interface 530 can connect to interface devices such as input devices (keyboard, pointing device, touchscreen, microphone, camera, scanner, sensors, etc.) and/or output devices (display devices, speaker devices, printers, motors, etc.). Some implementations can provide a microphone for capturing sound (e.g., as a part of captured images, voice commands, etc.), audio speaker devices for outputting sound, or other input and output devices.

The processor 520 (such as processor 140 described with regard to FIG. 1) may process instruction for execution within the game server 500 including instructions stored in memory 502 or on the data store 50. The processor 520 may coordinate computing device components, e.g. applications, wireless or wired communication through interfaces, etc. In some implementations, multiple processors and buses may be used.

The processor 520 may be implemented as a chipset of chips that include separate and multiple analog digital processors. The processor may also be implemented using various architectures. For example, the processor 520 may be a CISC (Complex Instruction Set Computer) processor, RISC (Reduced Instruction Set Computer) processor or MISC (Minimal Instruction Set Computer) processor.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems.

The memory 502 stores information within the game server 500. The memory 502 may be any suitable data storage, memory and/or non-transitory computer-readable storage media, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SauS) delivered from a server (e.g., a distributed system and/or a cloud computing system).

Data store 508 may keep training data, pre-processed text data, applications, and other data. Data store may also be employed to store the original image as well as various edited versions of the image. At least a portion of the information may also be stored on a disk drive or other computer readable storage device (not shown) within the game server 500. Such storage device include a floppy disk device, a hard disk device, an optical disk device, or a tape device, digital cards, a flash memory or other similar solid state memory device, or an array of devices. In some implementations, data storage 508 includes a machine learning repository 514 for aggregating, updating, managing and retrieving the trained machine learning models.

One or more computer programs 510, also referred to as programs, software, software applications or code, may also contain instructions that, when executed, perform one or more methods, such as those described herein. The computer program may be tangibly embodied in an information carrier such as computer or machine readable medium, for example, the memory 502, storage device or memory on processor 520. A machine readable medium is any computer program product, apparatus or device used to provide machine instructions or data to a programmable processor.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time. A number of implementations have been described. Features described with conditional language may describe implementations that are optional. The functional blocks, methods, devices, and systems described in the present disclosure may be integrated or divided into different combinations of systems, devices, and functional blocks as would be known to those skilled in the art.

Although the description has been described with respect to particular implementations thereof, these particular implementations are merely illustrative, and not restrictive. Concepts illustrated in the examples may be applied to other examples and implementations. Thus, various modifications may be made without departing from the spirit and scope of this disclosure and other implementations are within the scope of the following claims.

Methods described herein can be implemented by computer program instructions or code, which can be executed on a computer. In some implementations, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system).

Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (GPUs), Application Specific Integrated Circuits (ASICs), and the like. One or more methods can be performed as part of or component of an application running on the system, or as an application or software running in conjunction with other applications 512 and operating system 514.

Example System Architecture

Figure 6:
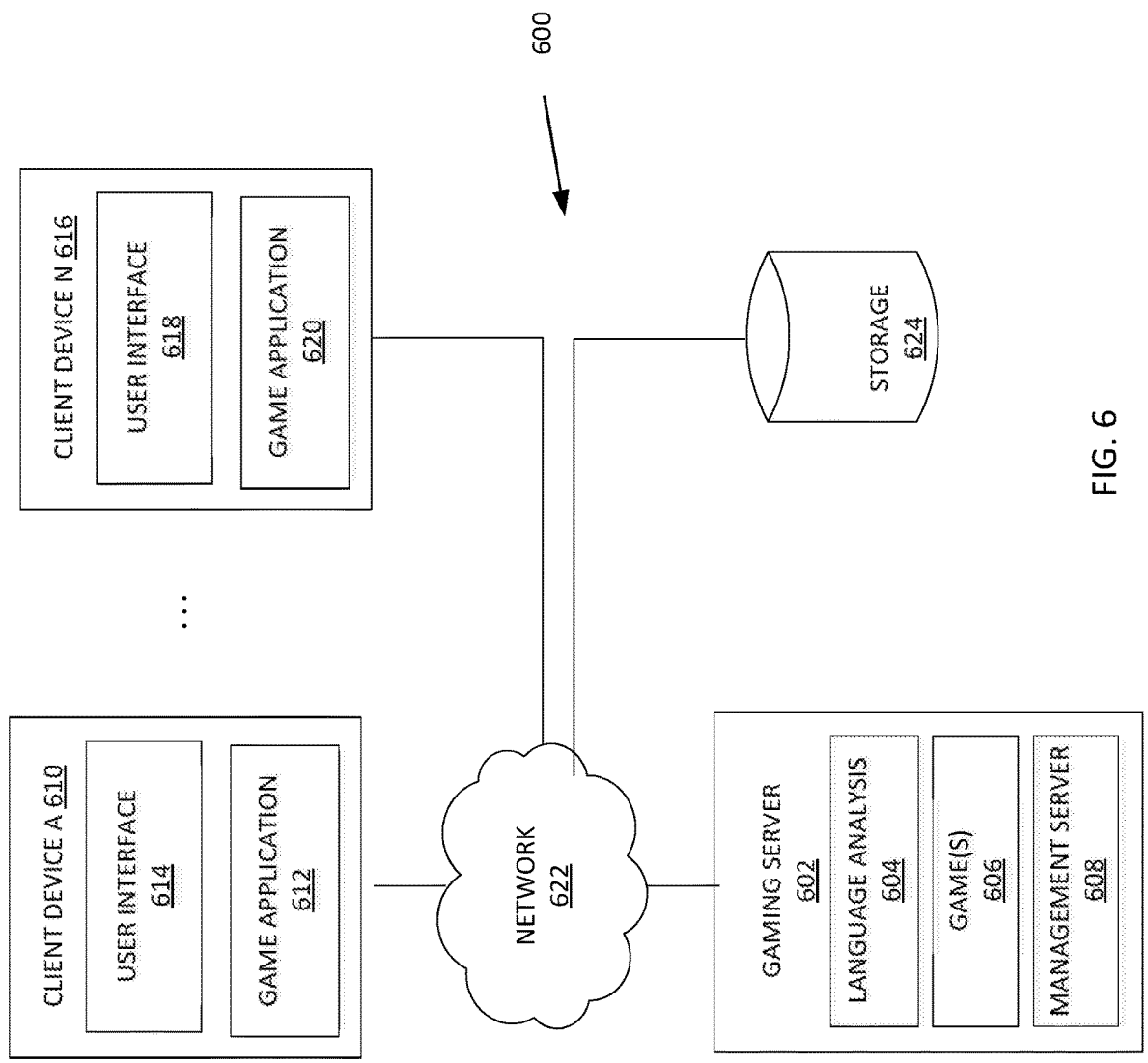
FIG. 6 is a block diagram of exemplary online game system architecture for a user quay to be communicated from a client device to a computing device, the user query to be analyzed and a search result response to be transmitted to the client device, in accordance with some implementations.

In FIG. 6, an example game system architecture 600 (also referred to as "system" herein) includes a game server 602 (for example, game server 500 described with regard to FIG. 5), a first client computing device A 610, and at least one other client computing device N 616 (where "N" represents any number of one or more client devices).

The game server 602 may include the language analysis system 604 (such as language analysis system 134 described with regard to FIG. 1) and one or more online games 606. The game server 602 may also include a game management module 608 to provide search result responses to client devices 610 and 616 and manage client access to online games 606. The game server 602 may be operatively coupled to or otherwise in communication with storage 624. The system architecture 600 is provided for illustration of one possible implementation. In other implementations, the game system architecture 600 may include the same, fewer, more, or different elements configured in the same or different manner as that shown in FIG. 6.

A communication network 622 (such as network 122 described with regard to FIG. 1) may be used for communication between the game server 602 and the client devices 610, 616, and/or between other elements in the game system architecture 600. The network 622 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a long term evolution (LTE) network), routers, hubs, switches, server computers, or a combination thereof.

The client devices 610, 616, such as a personal computer, mobile device, or video game console, may include a game application 612, 620 and one or more input/output devices 614, 618 (e.g., audio/video input/output devices) to input user queries from the user and receive query results from game server 602. The input/output devices 614, 618 can interface to other input and output devices. In some implementations, the input/output devices 614, 618 can connect to interface devices such as input devices (keyboard, pointing device, touchscreen, microphone, camera, scanner, sensors, etc.) and/or output devices (display devices, speaker devices, printers, headphones etc.). Some implementations can provide a microphone for capturing sound (e.g. voice commands), audio speaker devices for outputting sound (e.g. search result responses), or other input and output devices.

The game system architecture 600 may further include one or more storage devices 624. The storage device 624 may be, for example, a storage device located within the game server 602 or communicatively coupled to the game server 602 via the network 622. The storage device 604 may store, for example, training text data, unprocessed text data, user-specific information, e.g. user profile information, trained machine learning models such as in a machine learning model repository (e.g., 514 of FIG. 5), language-specific database etc.

In one implementation, the storage device 624 may be a non-transitory computer readable memory (e.g., random access memory), a cache, a drive (e.g., a hard drive), a flash drive, a database system, or another type of component or device capable of storing data and other content. The storage device 624 may also include multiple storage components (e.g., multiple drives or multiple databases) that may also span multiple computing devices (e.g., multiple server computers).

In one implementation, the storage device 624 may be a non-transitory computer readable memory (e.g., random access memory), a cache, a drive (e.g., a hard drive), a flash drive, a database system, or another type of component or device capable of storing data and other content. The storage device 624 may also include multiple storage components (e.g., multiple drives or multiple databases) that may also span multiple computing devices (e.g., multiple server computers).

In some implementations, the game server 602 may include a server having one or more computing devices (e.g., a cloud computing system, a rackmount server, a server computer, cluster of physical servers, etc.). In some implementations, the game server 602 may be included in the online gaming platform 402, be an independent system, or be part of another system or platform.

In some implementations, the game server 602 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the game server 602 and to provide a user with access to game server 602. The game server 602 may also include a website (e.g., a webpage) or application back-end software that may be used to provide a user with access to content provided by game server 602. For example, a user may access game server 602 using the game application 612 on the client device A 610 and game application 620 on client device N 616.

In some implementations, game server 602 may be a type of social network providing connections between users or a type of user-generated content system that allows users (e.g., end-users or consumers) to communicate with other users on the online gaming platform 402, where the communication may include voice chat (e.g., synchronous and/or asynchronous voice communication), video chat (e.g., synchronous and/or asynchronous video communication), or text chat (e.g., synchronous and/or asynchronous text-based communication).

In some implementations of the disclosure, a "user" may be represented as a single individual. However, other implementations of the disclosure encompass a "user" being an entity controlled by a set of users or an automated source. For example, a set of individual users federated as a community or group in a user-generated content system may be considered a "user."

In some implementations, online gaming platform 602 may be a virtual gaming platform. For example, the gaming platform may provide single-player or multiplayer games to a community of users that may access or interact with games using client devices 610, 616 via the network 622. In some implementations, games (also referred to as "video game," "online game," or "virtual game" etc. herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., the client device 610 and/or 616) within a game (e.g., the game 606) or the presentation of the interaction on a display or other user interfaces (e.g., the user interface 614, 618) of client devices 610, 616.

In some implementations, the game 606 can include an electronic file that can be executed or loaded using software, firmware or hardware configured to present the game content (e.g., digital media item) to an entity. In some implementations, the game application 612, 620 may be executed and the game(s) 606 rendered in connection with the game server 60*s*.

Reference to "some implementations" or "some instances," as used above, means that a particular feature, structure, or characteristic described in connection with the implementations or instances can be included in at least one implementation of the description. The appearances of the phrase "in some implementations" in various places above, are not necessarily referring to the same implementations.

In the above detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to particular hardware. However, the implementations can apply to any type of computing device that can receive data and commands, and any peripheral devices providing services.

What is claimed is:

1. A method of language-based searching for a user query for online games, wherein the method comprises:
receiving the user query;
separating the user query into a plurality of n-grams;
identifying at least one candidate language of the user query, by applying a machine learning model to the plurality of n-grams of the user query, wherein the machine learning model is trained to identify the at least one candidate language with at least one multilingual text corpus and game-related data;
determining, by applying the machine learning model, a respective confidence score for each of the at least one candidate language;
identifying one or more response matches to the user query in language-specific game databases each associated with a respective language of the at least one candidate language that has the confidence score meeting a confidence threshold;
determining a respective match score for each of the one or more response matches;
determining a weighted score for each of the one or more response matches by boosting or demoting each of the one or more match scores with the respective confidence score of the corresponding candidate language; and
providing a response of search results including game information associated with particular response matches, based, at least in part, on the respective weighted score.

2. The method of claim 1, wherein providing the response includes ranking the response matches according to the respective weighted scores, and the method further comprises: generating a top number of the search results that meet a ranking threshold.

3. The method of claim 2, wherein generating the search results is further based on a language of one or more prior games played by a user of the user query, as provided in user profile information associated with the user.

4. The method of claim 1, wherein the game information includes connect information for online games used by one or more user interface elements displayed on a user interface of a user device to navigate to a particular online game or provide a description of the particular online game, when the one or more user interface elements are activated by a user.

5. The method of claim 1, wherein determining the respective confidence score includes determining, by the machine learning model, one or more segments of the plurality of n-grams that are relevant to the at least one candidate language.

6. The method of claim 1, wherein the at least one candidate language includes an unidentified language and the language-specific game databases include a database associated with unknown languages.

7. A method of training a machine learning model to identify candidate languages of a user query for online games, wherein the method comprises:
receiving text data comprising first text data, associated language labels for the first text data, and second text data unlabeled for languages;
determining associated language labels for the second text data, based on at least two non-specific language detectors each identify a same language with a minimum confidence threshold;
when the at least two non-specific language detectors fail to identify the same language with the minimum confidence threshold, excluding the second text data from training text data;
creating the training text data by separating the text data into n-grams; and
training the machine learning model to generate at least one candidate language identifier of the user query and a respective language confidence score, wherein the training comprises:
training with the training text data without the associated language labels to obtain current predicted language labels by the machine learning model; and
retraining the machine learning model with discrepancy information between the current predicted language labels and the associated language labels, to update the current predicted language labels.

8. The method of claim 7, wherein the training further comprises iteratively repeating the retraining until the discrepancy information meets a threshold of accuracy.

9. The method of claim 7, wherein creating the training text data further includes splitting word strings of the text data having a length greater than an upper threshold length, into random word lengths of a predetermined length.

10. The method of claim 7, wherein creating the training text data further includes aggregating work strings of text data having a length shorter than a low threshold length, with related text to create extended strings of words.

11. The method of claim 7, wherein creating the training text data is by determining the n-grams that meet a commonality threshold across languages and within languages.

12. The method of claim 7, wherein the n-grams include at least one of: one character, two characters, or three characters.

13. The method of claim 7, wherein the text data includes at least one collection of game-related data that includes at least one of online game titles or online game source data.

14. A system comprising a computing device for detecting language of a user query for online games, wherein the computing device comprises:
one or more processors; and
logic encoded in one or more tangible media for execution by the one or more processors and when executed operable to perform operations comprising:
receiving the user query;
separating the user query into a plurality of n-grams;
identifying at least one candidate language of the user query, by applying a machine learning model to the plurality of n-grams, wherein the machine learning model is trained to identify the at least one candidate language with at least one multilingual text corpus and game-related data;
determining, by applying the machine learning model, a respective confidence score for each of the at least one candidate language;
finding one or more response matches to the user query in language-specific game databases associated with each of the at least one candidate language that has a confidence score meeting a confidence threshold; and
determining a respective match score for each of the one or more response matches;
determining a weighted score for each of the one or more response matches by boosting or demoting each of the one or more response match scores with the respective confidence score of the candidate language of each of the one or more response matches; and providing search results including game information associated with particular response matches, based, at least in part, on respective weighted scores.

15. The system of claim 14, wherein providing the search results includes ranking the response matches according to the respective weighted scores, and the operations further comprise:

generating a top number of the search results with a weighted score over a predefined value.

16. The system of claim 15, wherein generating the search results is further based on a language of one or more prior games played by a user of the user query, as provided in user profile information associated with the user.

17. The system of claim 14, wherein the game information includes connect information for online games used by one or more user interface elements displayed on a user interface of a user device to navigate to a particular online game or provide a description of the particular online game, when the one or more user interface elements are activated by a user.

18. The system of claim 14, wherein determining the respective confidence score includes determining, by the machine learning model, one or more segments of the plurality of n-grams that are relevant to the at least one candidate language.

19. The system of claim 14, wherein the at least one candidate language includes an unidentified language and the language-specific game databases include a database associated with unknown languages.

* * * * *